United States Patent Office 3,095,436
Patented June 25, 1963

3,095,436
ALKALI METAL-ETHER COMPLEX SALTS OF A NITROGENOUS GROUP VIB METAL PENTA-CARBONYL ANION
Raymond E. Maginn, Detroit, Mich., assignor to Ethyl Corporation, New York, N.Y., a corporation of Virginia
No Drawing. Filed Apr. 11, 1961, Ser. No. 102,123
11 Claims. (Cl. 260—438)

This invention relates to novel organometallic compounds. More specifically, the invention relates to ionic compounds of group VIB metals in which an anion having the formula:

$$[M(CO)_5(^C_N)]$$

is bonded to a cation. In the above formula, M is a group VIB metal i.e., chromium, molybdenum, and tungsten. Group $$(^C_N)$$

is written with the C above the N so as not to denote a preference of the metal atom, M, toward either the carbon atom or nitrogen atom for bonding. In reality, there may well be a preference toward either the carbon or nitrogen atom for bonding. I have not been able to determine as yet, however, what if any, preference exists. The ionic compound in which the above anion is bonded to a cation is stabilized by the presence of certain specified ethers in the molecule. Also included in my invention is a method for making the above mentioned compounds.

An object of this invention is to provide novel organometallic compounds of group VIB metals. A further object is to provide compounds in which a cation is bonded to an anion having the formula:

$$[M(CO)_5(^C_N)]$$

as defined above, which compound is stabilized by the presence of specified ethers in the molecule. An additional object of this invention is to provide a method for making the above mentioned compounds. Still further objects will become apparent from the following discussion and claims.

The objects of my invention are accomplished by reacting a cyanide salt with a group VIB metal-hexacarbonyl compound in the presence of a specified solvent. Applicable cyanide salts which may be employed in forming my novel compounds are alkali metal-cyanide salts such as sodium cyanide, potassium cyanide, lithium cyanide, rubidium cyanide, and cesium cyanide. Also, I can employ alkaline earth metal-cyanide salts as reactants.

As stated above, the reaction is carried out in the presence of a specified solvent. In my experimental work, I found the nature of the solvent to be critical to the success of the reaction. Applicable solvents which I can employ are the bidentate non-cyclic ethers such as dimethoxy ethane, diethoxy ethane, dipropoxy propane, and the like. These solvents stabilize the ionic compound which is formed between the cation which is an alkali metal, and an anion having the formula:

$$[M(CO)_5(^C_N)]$$

The compounds produced by my process are quite unique and differ markedly from conventional etherates. In a conventional etherate, the ether is bound loosely within the molecule such that it is easily removed. In contrast, the bidentate ether present in my ionic compounds is firmly bound within the molecule so that it cannot be easily removed. As an example, I have found that my compounds can be recrystallized from ethers which are not the same as the complexed ether without loss of the complexed ether. To illustrate, the compound sodium bis(dimethoxy ethane) chromium pentacarbonyl-$(^C_N)$ can be recrystallized from diethyl ether without removal of the complexed dimethoxy ethane.

My compounds can be depicted as having the following generic formula:

$$A(Y)_xM(CO)_5(^C_N)$$

in which A is an alkali metal cation (preferably sodium), Y is a bidentate non-cyclic ether, and x is an integer ranging from 2 to 4. Preferably, x is two. M is a group VIB metal, i.e., chromium, molybdenum, and tungsten, and the group $$(^C_N)$$

contains one carbon and one nitrogen atom, one of which is bonded to the group VIB transition metal M. Examples of compounds within the ambit of the above formula are sodium bis(1,2-dimethoxy ethane) chromium pentacarbonyl-$(^C_N)$ sodium bis(1,3-diethoxy propane) molybdenum pentacarbonyl-$(^C_N)$ sodium bis(1,2-dipropoxy ethane) tungsten pentacarbonyl-$(^C_N)$ and the like.

My ionic compounds are formed by reacting an appropriate cyanide salt such as sodium cyanide, potassium cyanide, lithium cyanide, or calcium dicyanide with a group VIB metal hexacarbonyl in the presence of a specified ether as described above. My process is preferably carried out in the presence of an inert atmosphere such as nitrogen, argon, krypton, neon, or the like. Preferably, nitrogen is used as the inert atmosphere since it is cheaper and more plentiful than other of the enumerated inert gases. The reaction temperature is not critical but preferably ranges from about 80° C. to about 150° C.

My process is normally conducted at atmospheric pressure but may be conducted at higher pressures if desired. In the event that the non-cyclic bidentate ether solvent is relatively low boiling, it may be advantageous to carry out the reaction under pressure since this enables the use of higher temperatures without solvent loss. During my process, I preferably agitate the reaction mixture since this affords a more even reaction rate, a shorter reaction time, and facilitates removal of carbon monoxide from the reaction mixture.

The relative quantities of reactants used are not critical. An excess of either the group VIB metal-hexacarbonyl or the cyanide salt may be used if desired. The non-cyclic bidentate ether reactant is employed in the reaction in a large excess, i.e., in solvent quantities. The time required for the reaction is determined by the other reaction variables employed. Thus, an increase in the reaction temperature and an increase in the degree of agitation will cause a proportionate decrease in the reaction time which is required. In practice, it is not difficult to determine the reaction time with reasonable accuracy. This is done by determining the amount of gas evolved from the reaction mixture. When a quantity of gas is evolved which is equal to the displacement of one equivalent of carbon monoxide from the group VIB metal hexacarbonyl reactant, this shows that the reaction is essentially complete.

The products of my reaction are, in general, solids which are crystalline in nature. They are readily separated from the reaction mass by conventional means such as evaporation of solvent under vaccum followed by crystallization and filtration of product. To illustrate further the scope of my process and the products produced thereby, there are presented the following examples in which all parts and percentages are by weight unless otherwise indicated.

*Example I*

A mixture comprising 11.0 grams of chromium hexacarbonyl, 2.45 grams of sodium cyanide and 200 mls. of 1,2-dimethoxy ethane was heated at reflux under nitrogen for 7 hours. During this time, 1150 mls. of gas were evolved. The orange reaction mixture was then filtered to remove a small quantity of unreacted sodium cyanide. The solvent was removed from the filtrate at reduced pressure to give 13.5 grams of yellow solids. These were recrystallized several times from diethylether to yield almost colorless crystals having a melting point of 62–64° C. The crystals were stable in air for short periods of time; they were soluble in water and ether, but insoluble in petroleum ether and n-hexane. The infrared spectrum of the crystalline compound showed a

bond at 4.8 microns and metallocarbonyl bands at 4.9, 5.2, and 5.4 microns. Dimethoxy ethen bands were observed at 9.0 and 9.2 microns. On analysis there was found: C, 39.7; H, 4.93; N, 4.12; Na, 5.34; Cr, 12.7. Calculated for $C_{14}H_{20}O_9NNaCr$: C, 39.9; H, 4.80; N, 3.34; Na, 5.46; Cr, 12.4 percent. On the basis of the above elemental analysis and infrared spectrum, the compound was clearly identified as

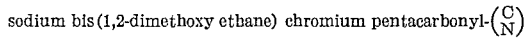

When Example I is repeated employing potassium cyanide, lithium cyanide, rubidium cyanide, or cesium cyanide in place of the sodium cyanide reactant, there are obtained the corresponding potassium, lithium, rubidium, or

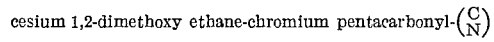

compounds. Likewise, when molybdenum hexacarbonyl or tungsten hexacarbonyl are employed in place of chromium hexacarbonyl in Example I, there are obtained the compounds

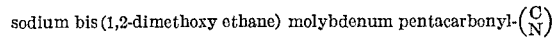

and

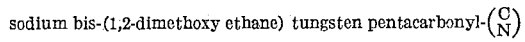

*Example II*

A mixture comprising one mole of molybdenum hexacarbonyl and one mole of sodium cyanide in 1,2-dipropoxy ethane solvent is heated for four hours at 120° C. under nitrogen. The reaction product is then discharged and filtered. A small quantity of petroleum ether is added to the filtrate and there is precipitated the product

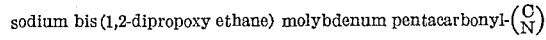

The product is filtered and washed with petroleum ether after which it is recrystallized from diethyl ether to give a good yield of pure product.

When Example II is repeated employing lithium cyanide or potassium cyanide, in place of sodium cyanide, the corresponding lithium and

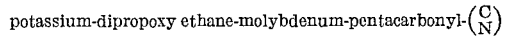

compounds are obtained.

*Example III*

A mixture comprising one mole of tungsten hexacarbonyl and one mole of sodium cyanide in 1,3-dimethoxy propane solvent is heated for 6 hours at 100° C. under nitrogen. The reaction product is then discharged and filtered and a small quantity of petroleum ether is added to the filtrate. The addition of the petroleum ether causes the precipitation of the product

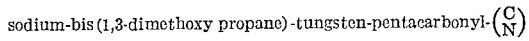

The compound is separated by means of filtration after which it is washed with petroleum ether and recrystallized from diethyl ether.

When Example III is repeated employing lithium cyanide or cesium cyanide in place of sodium cyanide, the corresponding lithium or

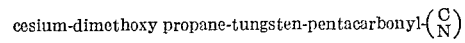

compounds are obtained. Similarly, when an alkaline earth metal cyanide is employed as the reactant, there are obtained the

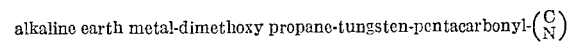

compounds.

As shown in the preceding examples, my invention provides a variety of alkali metal salts of a group VIB metal

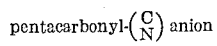 anion

In each case, the salt is stabilized by the presence of a non-cyclic bidentate ether. Unlike well-known etherates of the prior art, the non-cyclic bidentate ether present in my compounds is an integral part of the compound and is not easily removed. Thus, my compounds can be recrystallized from an ether solvent without loss of the complexed non-cyclic bidentate ether.

A utility for my compounds is as chemical intermediates. In this use, my compounds can be employed in the formation of other useful products which, in turn, can be converted to well-known organic compounds. To illustrate, there is presented the following example in which all parts and percentages are by weight unless otherwise indicated.

*Example IV*

A mixture comprising 12.6 grams of

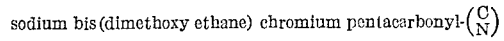

as prepared in Example I, 4.2 grams of benzoyl chloride, and 150 mls. of diethyl ether was stirred for two days at room temperature under nitrogen. The sodium chloride precipitate which had formed was then filtered off from the reaction mass and solvent was removed from the filtrate at reduced pressures to give an orange residue which was extracted with petroleum ether. Cooling of the extracts followed by filtration gave 3.5 grams of orange solids. This constituted a 37 percent yield of product. The solids were recrystallized from petroleum ether to give orange crystals having a melting point of 84–86° C. which were soluble in organic solvents but insoluble in water. The crystalline product was readily sublimed using a warm water bath (50° C.). The infrared spectrum of the product showed major peaks at 4.75, 5.2, and 6.0 microns. Magnetic measurements indicated that the product was diamagnetic. The product was quite air stable and little change was noted after it had stood for several hours in air at room temperature. On analysis there was found: C, 48.0; H, 1.45; N, 4.45; Cr, 16.2 percent with a molecular weight of 349 (Signer method). Calculated for $C_{13}H_5O_6NCr$: C, 48.3; H, 1.55; N, 4.33; Cr, 16.1 percent with a molecular weight of 323. On the basis of the product's elemental analysis, infrared spectrum, and molecular weight, it was determined to be the compound

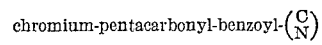

In a subsequent run when the reaction time was increased to five days, the yield of product was increased to 54 percent.

Example V

A solution comprising 1.62 grams of chromium-pentacarbonyl-benzoyl-$\binom{C}{N}$ as prepared in Example IV, in 100 mls. of anisole was refluxed for 3.5 hours during which time 540 mls. of gas was evolved. This reaction was carried out under nitrogen. The reaction mixture became fairly dark during the reaction and chromium hexacarbonyl was observed subliming in the condenser. A total of 0.3 gram of chromium hexacarbonyl, having a melting point of 153–154° C. was so isolated. The solvent was then removed from the unfiltered reaction mixture to yield an oily residue. An infrared spectrum of the trap distillate indicated only anisole to be present. The oily residue was evaporatively distilled overnight to give a clear viscous yellow liquid. The infrared spectrum of this liquid indicated the possible presence of anisole, anisole chromium tricarbonyl, and p-methoxy benzophenone with no evidence for the presence of the starting material chromium-pentacarbonyl-benzoyl-$\binom{C}{N}$ The liquid was chromatographed on alumina to yield anisole, 0.12 gram of anisole chromium pentacarbonyl, and 0.10 gram of p-methoxy benzophenone having a melting point of 60–61° C. The infrared spectrum of this product was identical to that of a pure sample of p-methoxy benzophenone.

The product p-methoxy benzophenone is a well-known organic compound having well known utilities in organic synthesis.

Example VI

A solution comprising 1.62 grams of chromium-pentacarbonyl-benzoyl-$\binom{C}{N}$ as prepared in Example IV, in 75 mls. of methanol was refluxed for 5 hours under nitrogen. The solvent was removed from the clear green-yellow solution under reduced pressure, leaving a brownish-red oily residue. The residue was evaporatively distilled overnight, yielding 0.32 gram of a clear liquid having a sweet ester-like odor. The infrared spectrum of this liquid was identical to that of pure methyl benzoate which conclusively established the product as methyl benzoate.

The product, methyl benzoate, as prepared in Example VI, is a well-known organic compound which is used extensively in perfumery.

A further use for my compounds is in metal plating. In this application, the compounds are thermally decomposed in an atmosphere of a reducing gas such as hydrogen or a neutral atmosphere such as nitrogen to form a group VIB metal-containing film on a substrate material. The substrate material can be heated above the decomposition temperature of the compound and brought into contact with the compound. Another way of applying the film to the substrate material is to lightly coat the substrate material with the compound after which the coated substrate material is heated to a temperature above the decomposition temperature of the compound.

The metal-containing films which are formed from my compounds have a wide variety of applications and may be used in forming conductive surfaces such as employed in a printed circuit, in producing a decorative effect on a substrate material or in forming a corrosion-resistant coating on a substrate material. A still further utility for my compounds is as catalysts in the preparation of organic compounds.

Having fully defined the novel compounds of my invention, their mode of preparation and their many utilities, I desired to be limited only within the scope of the appended claims.

1. Compounds having the formula:

$$A(Y)_2M(CO)_5\binom{C}{N}$$

in which A is an alkali metal cation, Y is a bidentate non-cyclic ether, and M is a group VIB metal.

2. The compounds of claim 1 in which M is chromium.
3. The compounds of claim 1 in which A is sodium.
4. The compounds of claim 1 in which Y is 1,2-dimethoxy ethane.
5. Compounds having the formula:

$$Na(Y)_2Cr(CO)_5\binom{C}{N}$$

in which Y is a bidentate non-cyclic ether.

6. Sodium bis(1,2-dimethoxy ethane) chromium pentacarbonyl-$\binom{C}{N}$

7. Process for the preparation of the compounds of claim 1, said process comprising reacting an alkali metal cyanide with a group VIB metal hexacarbonyl in the presence of a non-cyclic bidentate ether.

8. The process of claim 7 in which the group VIB metal hexacarbonyl is chromium hexacarbonyl.

9. The process of claim 7 in which the alkali metal cyanide is sodium cyanide.

10. The process of claim 7 in which the non-cyclic bidentate ether is 1,2-dimethoxy ethane.

11. Process comprising reacting sodium cyanide with chromium hexacarbonyl in the presence of dimethoxy ethane.

References Cited in the file of this patent
UNITED STATES PATENTS 2,870,183     Brantley _____ Jan. 20, 1959
2,885,417     Heyden _____ May 5, 1959

OTHER REFERENCES

J. Chem. Soc., July 1959, page 2323.
Karrer: "Organic Chemistry," New York, 1938, pages 105–106, Bookcase VII.